United States Patent

[11] 3,585,584

[72] Inventor Gene E. Behrend
 3600 W. Buena Vista, Fresno, Calif. 93705
[21] Appl. No. 799,370
[22] Filed Feb. 14, 1969
[45] Patented June 15, 1971

[54] INTRUDER DETECTOR AND WARNING SYSTEM
 17 Claims, 3 Drawing Figs.
[52] U.S. Cl. ..................................................... 340/64,
 340/276
[51] Int. Cl. ..................................................... B60r 25/10,
 B60r 25/04
[50] Field of Search ........................................ 340/64, 63,
 276

[56] References Cited
UNITED STATES PATENTS
2,289,296 7/1942 Provan .......................... 340/276
2,515,044 7/1950 Kappel .......................... 340/63
2,892,181 6/1959 Benson et al. ................. 340/64

Primary Examiner—John W. Caldwell
Assistant Examiner—Glen R. Swann, III
Attorney—Huebner and Worrel ABSTRACT: An intruder detector and warning system including transistorized intruder detecting and warning circuits particularly suited for use with automobiles of the type including an enclosure having a multiplicity of access doors and an electrical ignition system, a feature of the invention being the provision of control and timing circuits interconnected between the energy source of the ignition circuit and an electrically driven warning device, such as the vehicle's horn, adapted to respond to an opening of a selected door of the vehicle, in the presence of an open ignition circuit, for establishing and imposing on the control circuit a delayed "-set" condition and to respond to a subsequent opening of the vehicle's hood, or any door thereof for energizing the control circuit and the associated warning device as well as effect a delayed interruption of the energization of the warning device at the expiration of a predetermined time interval subsequent to the closing of any opened doors of the vehicle, or the closing of an opened hood thereof.

Fig. 1.

GENE E. BEHREND
INVENTOR 3,585,584

INTRUDER DETECTOR AND WARNING SYSTEM

BACKGROUND OF THE INVENTION

The invention relates to intruder detector and warning systems and more particularly to a transistorized circuit adapted to be employed in motorized vehicles. The circuit is set at the opening of a given door of the vehicle and responds to a subsequent opening of the vehicle's hood, or any door thereof, to effect an activation of an alarm system and to disable the vehicle's ignition system.

The prior art is replete with antitheft circuits and associated devices for use with automobiles. Normally, such devices include circuits which ground the vehicle's ignition circuit, sever the fuel supply, lock various doors, and hoods, as well as perform various combinations of these functions.

Normally, known systems include control switches hidden within the operator's compartment which must be manually actuated. The switches normally are so obscured that a would-be thief is foiled in his attempt to gain access to the vehicle, or once having gained access, is precluded from starting and/or steering the vehicle. All of the foregoing devices suffer from one or more common inadequacies, among which is the requirement that the systems must be activated by the vehicle operator each time he dismounts or exits. This, of course, is a time consuming activity and frequently leads to undesired habits, since the operator may become accustomed to activating the antitheft system and not locking the vehicle. In the event the antitheft system fails to function or the operator fails to initiate operation of the system, an unlocked vehicle therefore is left totally unprotected. Furthermore, systems presently employed frequently may be discovered and inactivated once an intruder gains access to an equipped vehicle.

SUMMARY OF THE INVENTION

This invention overcomes the aforementioned difficulties through the use of a simple electrical circuit which electrically couples the door, normally provided switches, horn, and/or lamps and ignition circuits with the vehicle's battery for purposes of providing a system for detecting the presence of an intruder and then sounding the desired alarm.

Accordingly, an object of the instant invention is to provide a simplified intruder detecting and warning system for motorized vehicles.

Another object is to provide an improved circuit when readily interconnects existing circuit components of motorized vehicles for providing an efficient intruder detecting and warning system.

Another object is to provide a simplified transistorized circuit which may be mounted on a simple circuit board and connected within the electrical circuits of existing vehicles for the purpose of detecting intruders and providing audible and visual warnings of an intruder's presence.

Another object is to provide a transistorized vehicle intruder detecting and warning system, including transistorized timing circuits, which provides for a delay in the "setting" thereof and accommodates a driver's exit of the associated vehicle, and which responds to a subsequent opening of the hood or any door of the vehicle, in the presence of an open ignition circuit for establishing an alarm, and which will automatically reset after a predetermined delay when an open door is subsequently closed.

BRIEF DESCRIPTION OF THE PREFERRED EMBODIMENTS

Figure 1:
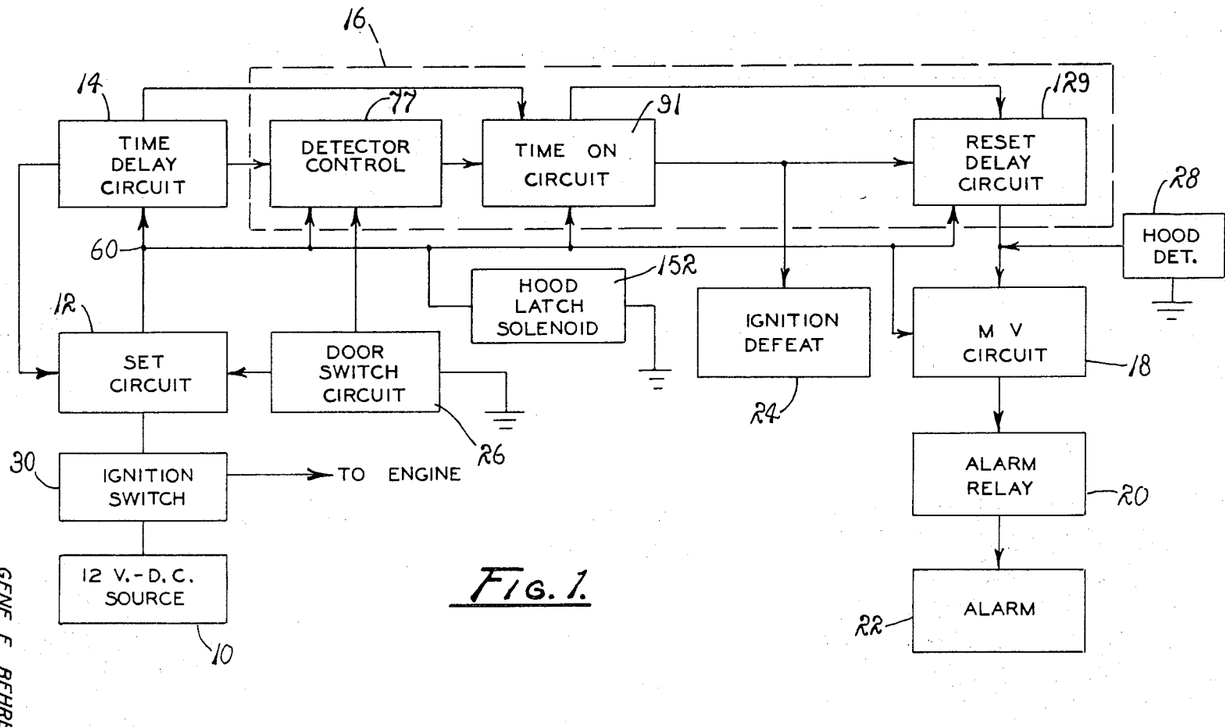
FIG. 1 is a blocked diagram of the system embodying the principles of the present invention.

Turning to FIG. 1, therein is illustrated a system embodying the principles of the present invention which includes a transistorized circuit particularly adapted to be mounted on a convenient circuit board. The circuit boards are fabricated employing known, fabrication techniques, including photoetching processes and the like. While not shown, the completed circuit board employed may be coated with an epoxy and mounted inside a suitable housing which, in turn, is mounted within a vehicle at a convenient location.

The system is, in practice, powered by the vehicle's battery or source of electrical energy 10. This source normally is a DC (direct current) source of electrical potential and commonly is present in automotive vehicles as a 12 volt battery. As a practical matter, the source 10 usually is connected ahead of the vehicle's ignition switch, as shown in FIG. 1.

The output signal from the source 10 is applied as a positive voltage, relative to ground. A "set" circuit 12 is coupled to the output of the battery 10 and is provided to close an electrical circuit to a time delay circuit 14 and thence to an associated system control circuit 16 only in the presence of an open ignition circuit. Consequently, when the associated vehicle is in operation, so that the ignition circuit is closed, the circuit 12 is open between the source 10 and the circuits 14 and 16. However, once the ignition circuit is opened, the circuit 12 may be rendered effective to cause a positive voltage to be applied to the circuits 14 and 16.

The output from the control circuit 16 is employed to drive a multivibrator circuit 18 which, when activated, drives an alarm relay 20 connected thereto and adapted to energize a suitable alarm device 22. In practice, the alarm 22 is the vehicle warning system which includes the horn. If preferred, the relay of the alarm 22 also may include, in addition to means for controlling the horn, means to control the head lamps as well as the interior lamps of the associated vehicle. In some instances, it is desirable to ground the ignition circuit, in addition to sounding an alarm, therefore, an ignition defeat circuit 24 is incorporated and operatively connected at a convenient location.

One of the switches of the set of door switches 26 is employed so that the circuit 12, when energized, becomes activated to impose a "set" state on the control circuit in response to an opening of the ignition circuit, and an opening of the door adjacent the driver's compartment. However, as the driver departs the vehicle, the time delay circuit 14 is rendered effective for delaying the imposition of a "set" state for a predetermined period of time, which, in practice, is about 20 seconds, after which the control circuit 16 is "set." Once the circuit 16 is "set," a subsequent opening of any door of the vehicle, or the hood thereof, causes a circuit to be completed to ground through the multivibrator circuit 18 so that the voltage applied thereto effects an activation of the alarm relay 20 and energizes the alarm 22. In practice, it has been found desirable to incorporate a hood detector switch 28 into the system to achieve an activation of the alarm relay 20 in response to the opening of the hood.

First Form

Figure 2:
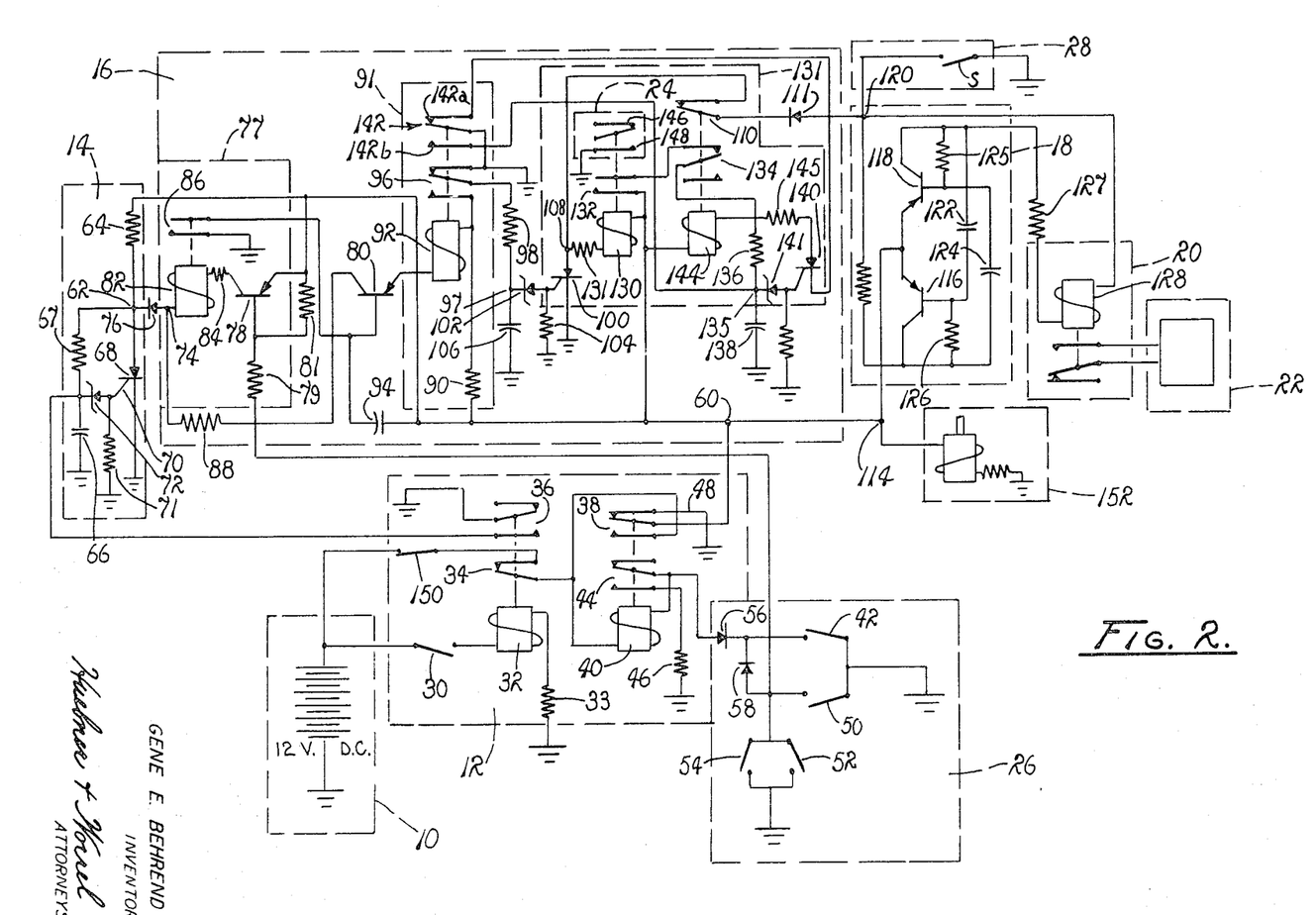
FIG. 2 is a functional diagram of the circuit shown in FIG. 1 illustrating the functional components of one modification of the circuit.

As illustrated, in FIG. 2, the ignition switch circuit includes a conventional key-operated ignition switch 30. This switch is connected in circuit series between the positive terminal of the battery 10 and ground through the coil of a normally-extended solenoid 32 and a current limiting resistor 33. The solenoid 32 is of suitable and convenient design, and is intended to retract against a spring which is employed to apply a mechanical bias to the solenoid shaft which is to be extended by the spring in the absence of an electrical current flowing through the winding thereof. The shaft of the solenoid 32 is connected through suitable linkage with a normally closed power switch 34 and a normally opened grounding switch 36. The switch 36 is connected to the time delay circuit and serves to ground the circuit when the ignition switch 30 is closed. Hence, it will be appreciated that the detection and warning system cannot be activated in the presence of a closed ignition circuit since the circuit 14 is at this time connected directly to ground through switch 36.

The switch 34 serves to couple the positive terminal of the battery 10 to the timing circuit 14, the control circuit 16, and the multivibrator circuit 18 through a normally opened switch 38 which switch is closed when the circuit is rendered operative. The switch 38 mechanically is connected with the output shaft of a solenoid 40 and is closed through the energization of the solenoid winding which retracts the shaft to close the switch 38, when the switch 34 is closed, for completing a circuit to the positive terminal of the battery 10. However, in order that the solenoid 40 may be energized, it also is necessary that a circuit be completed through the winding of the solenoid to ground. This is achieved through the use of a door switch 42 of the circuit 26. The door switches of the circuit 26 are each of the type commonly provided in door posts for automobiles for controlling the interior lamps thereof. The door switches close, for effecting energization of the interior lamps of the driver's compartment, when the associated door is opened. Therefore, it is to be understood that the switch 42 normally is available in most vehicles adjacent the driver's compartment and is so mounted as to be closed by the opening of the adjacent door adjacent to the driver's compartment. Should such switches not be provided in a selected vehicle, they are readily available and may be mounted therein.

When the switch 42 is closed, the circuit 16 is "set," that is a circuit is completed from the battery 10 to ground through the winding of solenoid 40 for driving the solenoid in a retracting mode, whereupon the switch 38 is closed. As the solenoid 40 is actuated to close the switch 38, a latching switch 44 is also closed between the winding of solenoid 40 and ground through a resistance 46, thus to "latch" the solenoid 40 with its shaft disposed in its retracted position so that the switch 38 thus is maintained in a closed condition. It has, in practice, been found desirable to provide means for assuring that no circuit can be completed through the switch 38 to the control circuit 16 when it is intended that the circuit be rendered inoperative. Therefore, a circuit grounding lead 48 has been provided for grounding the open contact of the switch 38.

It is to be particularly noted that in addition to the door switch 42, additional door switches 50, 52, and 54 are employed. The specific number of switches employed depend upon the number of doors provided for the vehicle. Each of the door switches, in effect, serves as mechanical detector switch for the detector system, simply by closing a circuit to ground as the doors are opened. It is noted that a pair of blocking diodes 56 and 58 are incorporated in the circuit 26 in series with the door switch 42 in a manner such as to accommodate the establishment of a current flow between the switch 42 and the source of energy 10, through the closed switch 44, while blocking current flow from the switches 50, 52 and 54. Therefore, it is apparent that the purpose of the diodes 56 and 58 is to assure that the switch 38 is closed only in response to an opening of the door adjacent the driver's compartment, since it is intended that the circuit be rendered operative only when the driver is exiting or dismounting the vehicle. Therefore, should any of the other door switches be closed, before the switch 42 is closed, no circuit can be completed from the source 10 to the control circuit 16. However, once the switch 42 has closed, for thus activating the solenoid 40, a closing of any of the other door switches, by the opening of the associated door, will serve to provide an output signal at ground potential to the control circuit 16 for thereby initiating activation of the alarm circuit 22.

The positive voltage output derived from the energy source 10 through switch 38 is applied at an output or positive voltage junction terminal 60. From the terminal 60, the positive voltage is applied to an input or junction terminal 62 of the timing circuit 14 connected thereto through a suitable load resistance 64. The voltage applied at the terminal 62 also is applied to a time-delay capacitor 66 of the time-delay circuit 14 through a resistance 67 connected with the terminal. The voltage thus applied through the resistance 67 serves to charge the capacitor 66. Of course, the interval required for charging the time delay capacitor is a function of the ohmage of the resistance 67. Consequently, the interval required for charging the capacitor 66 can be varied simply by altering the ohmic value of the resistance 67. Preferably, the ohmage of the resistance 67 is a magnitude such that a charging of the capacitor is precluded so long as the switch 42 is closed to thus introduce into the circuit a voltage-dividing effect. An SCR (silicon Control Rectifier) 68 is connected, at its positive side, as well as the gate lead 70 with the terminal 62. A suitable resistance 71 directly is connected between ground and the gage lead for imposing a bias thereon.

A Zener diode 72 is coupled between the capacitor 66 and the gate lead 70 of the SCR 68 so that once the capacitor 66 properly is charged, in response to the positive signal applied at the junction terminal 62, a gating pulse is caused to be applied to the gate of the SCR 68 for thereby switching the diode into its "on" or conductive state, thus to "set" the control circuit 16 or render it prepared for further operation.

Therefore, it will be appreciated that once the ignition switch is opened, and the door switch 42 is closed, a determinable delay is encountered at the capacitor 66 before the SCR 68 is switched, due to the charging time required for the charging of the capacitor 66. However, after the capacitor 66 has been charged, a signal is provided through Zener diode to the gate of the SCR 68 for forwardly biasing the SCR to a conductive state. When the SCR 68 is rendered conductive, a voltage, at ground potential, is applied therethrough to the terminal 62. A signal at ground potential is now applied to a junction terminal 74 connected with the terminal 62 through a suitable blocking diode 76 connected therebetween. Hence, as the capacitor 66 is charged, preferably in about 20 seconds subsequent to an opening of the switch 42, the gating signal is applied to the SCR 68 which then is switched. Therefore, a 20 second delay is encountered between the closing of the door of the vehicle adjacent the operator, for thus opening the switch 42, and the energization of the timing circuit, whereby ample time for exit purposes is provided.

Current flow through the control circuit 16 is controlled by a detector control circuit 77. This circuit includes a first solid state switching device or PNP transistor 78 having its base connected through a resistance 79 to the circuit 26, and a second PNP transistor 80. The collectors of both PNP transistors 78 and 80 are connected with the junction terminal 74 of the circuit 16, whereby a signal at ground potential may operatively be applied thereto. The emitter of transistor 78, however, is connected with the junction terminal 60, while the base thereof is reverse-biased through a biasing resistor 81 connected between the base of the transistor and the terminal 60, and is further connected, for forward biasing, with the door switches 42, 50, 52 and 54 of the circuit 26 through the resistance 79. Therefore, when a positive voltage is applied at the emitter, and a switch of any door of the vehicle is closed, a signal at ground potential is applied through the switch of the open door to the base of the transistor 78, whereupon the transistor is switched to a conducting state so that a current is caused to flow between ground and the emitter through the conducting SCR 68.

Connected in series between the terminal 74 and the collector of the transistor 78 there is the winding of a solenoid 82 coupled through an associated current limiting resistor 84. The solenoid 82 also includes a normally extended shaft which is operatively coupled with a normally opened switch 86, the opposite sides or contacts of which are connected to ground and to the base of the PNP transistor 80. Hence, when a current flow is established between the junction terminal 74 and the emitter of transistor 78, the winding of the solenoid 82 is energized and the shaft thereof is retracted so that the associated switch 86 is caused to close to ground, whereupon a signal at ground potential is applied to the base of the PNP transistor 80.

The collector of the transistor 80 is protected by a current limiting resistor 88 connected in series therewith, while the emitter thereof is connected to the junction terminal 60 through a current limiting resistor 90 located within a time-on circuit 91. The winding of a solenoid 92 is connected between the resistor 90 and the emitter of the transistor 80 within the circuit 91. This solenoid is similar in design to the solenoids 32, 40 and 82.

As a practical matter, a capacitor 94 having a preselected discharge time is connected between the base of the transistor 80 and the junction terminal 60 so that when the switch 86 is opened, due to deenergization of solenoid 82, a forward biasing voltage is applied to the base of the transistor 80, by the capacitor, for thus causing the transistor 80 to continue to conduct for a preselected period of time, as determined by the discharge time of the capacitor.

The shaft of the solenoid 92 is operatively connected with a normally opened switch 96. The switch 96 includes one contact connected with the junction terminal 60 while the operatively displaceable terminal thereof is connected with a junction terminal 97, through a load resistor 98. An SCR 100 is provided and connected through a Zener diode 102 to the terminal 97 through its gate lead, so that a gating signal is applied from the terminal 97 to the gate of the SCR for causing it to be switched. The SCR 100 is normally biased to an "off" state through biasing signal applied to the gate thereof by a resistance 104. A time-delay capacitor 106, which functions in a manner and for purposes similar to that of the capacitor 66, also is connected with the terminal 97 and is incorporated for imposing a desired delay in the switching functions of the SCR 100. Therefore, once the transistor 80 is caused to conduct, the winding of the solenoid 92 is energized and the shaft thereof operatively is driven for closing the switch 96, whereupon a positive voltage is applied from the junction terminal 60, through the contacts of switch 96, to the terminal 97 for causing the capacitor 106 to charge. After the capacitor 106 is charged, the SCR 100 is "switched."

Once the SCR 100 is caused to conduct, an output signal voltage, at ground potential, is provided at a junction terminal 108, connected with the SCR 100. The output of the SCR 100 is applied to the multivibrator circuit 18 through the junction terminal 108, which is located between the SCR 100 and the circuit 18 and is connected thereto through a normally closed switch 110 and a blocking diode 111. The terminal 108 will thus provide an output signal through the switch 110 to the multivibrator circuit 18 and the alarm relay 20. It will be noted that the positive voltage of the terminal 60 also is coupled with the multivibrator circuit 18 at a junction terminal 114. Hence, the multivibrator circuit 18 is caused to be connected between the positive voltage source 10 and ground through the terminals 108 and 114.

The multivibrator is of a convenient design, and therefore a detailed description thereof is omitted. However, it is to be understood that circuit 18 includes a pair of PNP transistors 116 and 118, the base of each being coupled to the terminal 108 through a circuit including an input terminal 120. Capacitors 122 and 124 are coupled to the collectors thereof through resistances 125 and 126. Furthermore, it is to be understood that the capacitors 122 and 124 alternately charge and discharge for alternately providing a biasing signal for switching the transistors 116 and 118 to conductive states. The collector of each of the PNP transistors is connected to the terminal 120 in order that each may conduct from ground through the SCR 100. It should be appreciated that the transistors 116 and 118 are thus alternatively fired or rendered conductive so that the transistor 118 is caused to be operated in a pulsing mode for actuating the relay 20. Connected in series between the transistor 118 and a terminal 120 there is a current limiting resistance 127 and the winding of a solenoid 128. This solenoid 128 serves as the alarm relay actuator for the alarm relay circuit 20. Hence, as a pulsing current flow is established between the terminal 120 and the transistor 118, the relay 20 is driven in a pulsing mode so that the alarm circuit 22 also is activated in a pulsing mode.

Also connected to the terminal 120 is a normally open hood switch S. The hood switch S is connected with the hood latch of the associated vehicle so that should the hood be lifted, the switch S will close for thus causing a signal at ground potential to be applied at the terminal 120 of the multivibrator circuit 18 so that the circuit now becomes energized, as a result of the closing of the switch S, for driving the relay solenoid 128 thus to drive the alarm 22. As a practical matter, the blocking diode 111 is included between the terminal 120 and the switch 110 for dictating direction of current flow through the switch 110.

Once the multivibrator circuit 18 has been activated, it will continue to function for so long as a circuit is completed to ground through the terminal 120. A closing of the hood will open switch S and remove the ground potential applied through the switch S. However, as any open door of the vehicle is closed, the circuit from ground to the terminal 120 is interrupted by the opening of the door-associated switch. When this circuit is interrupted, a positive bias is applied from the terminal 60 to the base of the transistor 78 through the resistance 81 so that this transistor is switched to an "off" state and ceases to conduct. When the transistor 78 ceases to conduct, the winding of the solenoid 82 is deenergized and the shaft thereof is extended and permits the switch 86 to open for thus interrupting the circuit applying a signal to the base of the transistor 80.

The transistor 80, however, will continue to conduct for a determinable period because of the encountered discharge of the capacitor 94 to the base of the transistor 80. Such a signal, however, is applied to the base of the transistor 80 only for a selected period of time, for example, 10 seconds. At the expiration of this period, the transistor 80 is switched "off" and ceases to conduct so that the switch 96 is opened to interrupt the circuit to the gate of the SCR 100 as the shaft of the solenoid is extended. At this time, no current is conducted through the switch 96. It will be appreciated that so long as the SCR 100 is conducting, a signal at ground potential is applied to the terminal 108 and hence to the multivibrator circuit 18. However, once the circuit between the SCR 100 and the circuit 18 is opened at 110, the circuit 18 ceases to function and the alarm 22 is silenced.

It has been determined advisable to incorporate a reset delay circuit 129 which imposes a delay of a predetermined length of time between the closing of an open door and the interruption of the alarm and the resetting of the circuit. A delay of 60 seconds has been adequate to accommodate an inadvertent opening of the doors while not unduly long for performing the required detection function. To accomplish the delay function, a solenoid 120 is operatively coupled between the terminals 60 and 108 through a current limiting resistance 131.

The shaft of the solenoid 130 is connected with the switch 132 which is closed by the solenoid 130 when the winding thereof is energized by a signal applied from the terminal 108, as the SCR 100 is caused to conduct. Hence, when the solenoid 130 is energized, a positive voltage signal is conducted through the switch 132 and then through a normally closed switch 134 and applied to a junction terminal 135 through a current limiting resistor 136. A capacitor 138 is connected between ground and the terminal 135 and is adapted to charge therethrough. An SCR 140, having its gate connected with the terminal 135 through a Zener diode 141, is connected to ground through a normally closed switch 142. This switch includes contacts 142a and 142b and is operatively connected to be actuated in response to an energization of the solenoid 92. It will be appreciated that contact 142a is normally closed and contact 142b is normally open. However, when the solenoid 92 is energized for closing the switch 96 to the gate of the SCR 100, the switch 142 is opened at its contact 142a between the SCR 140 and ground while a circuit is completed between the terminal 135 and ground through contact 142b. Conversely, when the winding of the solenoid 92 is deenergized, the switch 96 will be opened and the circuit between the SCR 140 and ground will close, while the circuit between the ground and the terminal 135 will open. When the contacts 142a close so that a circuit is completed from ground through the SCR 140, the terminal 135 is no longer grounded through the switch 142 so that as the capacitor 138 is permitted to charge imposing a delay, and at the expiration of the charge of the capacitor 138, the SCR 140 is switched, by a gating signal applied through the diode 141, and assumes a conducting state. A solenoid 144 and a current limiting resistor 145 are connected with the SCR 140 and with the switch 110 so that as the SCR is caused to conduct, a circuit is completed from ground to the terminal 60 through the solenoid 144 for energizing the winding thereof. When the winding of the solenoid 144 has been energized by a current flow established therethrough, the switch 110 between the terminal 108 and the multivibrator circuit 18 is opened through the displacement of the shaft of the solenoid 144, whereupon the circuit 18 ceases to function.

It should readily be apparent that the capacitor 138 must be charged before the SCR 140 is switched, therefore, a delay, preferably 60 seconds, is provided by allowing the capacitor to charge through the switch 134, after ground has been removed from terminal 135 at the switch 142, so that the alarm circuit continues to function, once initiated for one minute, even should the intruder close an open door of the vehicle.

Once the SCR 140 is switched "on," it causes the circuit to be latched closed through the solenoid 144 so that the switch 110 cannot close until the circuit to ground through the switch 142 is opened by a subsequent activation of the solenoid 92. Since a signal is still being applied at the terminal 108, and interruption of the circuit of the SCR 140 at the switch 142, will permit the circuit 18 to function as the switch 110 closes.

Also, it should be apparent that various means may be actuated in response to a closing of the switches connected to the various solenoids employed in the circuit. For example, it may be found desirable to provide a pair of normally closed contacts 146 connected in series with the ignition circuit of the vehicle and connected with the solenoid 130 so that when the solenoid 130 is actuated, the circuit will be closed between the source 10 and ground for grounding the ignition circuit. It should also be apparent that the switches 146 and 148 may be coupled at various points to achieve various desired grounding of the ignition circuit. For example, the contacts could be ganged with solenoid 40 so that the ignition circuit is grounded at the actuation of this solenoid.

In practice, it is highly desirable to include a disabling switch 150 which preferably is a microminiature switch adapted for manual operation, such as a toggle switch, for example, and is normally mounted at some obscure disposition within the confines of the operator's compartment. The purpose of this switch is to permit the vehicle to be operated with the detector and warning system intact, but which is to be employed by opening the circuit for disabling it when it is desired that the detector and warning circuit be rendered inoperative.

Further, it has been found practical to employ an additional hood-locking linkage connected with a solenoid 152 for drivingly displacing a hood latch, not designated, when the ignition circuit is opened. Normally, this solenoid is connected between ground and the terminal 60 and is energized when positive signal is applied to the terminal 60.

Operation of the First Form

Operation of the described embodiment of the first form of this invention is believed to be clearly apparent and is briefly summarized at this point.

In operation, it is assumed that the detector and warning circuit is mounted on the vehicle of the type which employs an electrical ignition circuit and includes the source of voltage 10. The toggle switch 150 manually has been closed and the ignition circuit has been opened at switch 30, for causing the switch 34 to close for thus completing a circuit for the junction terminal 60 from the positive terminal of the battery 10.

Furthermore, the circuit to ground has been opened at switch 36 for enabling the time-delay circuit 14 to be activated. As the vehicle operator dismounts the vehicle, the door adjacent the operator's compartment is opened so that the associated door switch 42, as normally provided for controlling the interior lamps, is closed. As the switch 42 closes, a circuit is completed between the source of voltage 10 and ground through the blocking diode 56. The solenoid 40 is thus caused to be activated and the circuit switch 38 is closed for completing the circuit between the terminal 60 and the closed switch 34 so that the positive voltage from the source 10 is now applied to the time-delay circuit 14, the control circuit 16, the multivibrator circuit 18, the alarm relay 20, and the winding of the solenoid 152 by the positive voltage appearing at the terminal 60.

The positive voltage applied to the junction terminal 60 is also applied at the junction terminal 62 and through the Zener diode 72 to the gate of the SCR 68, once the capacitor 66 is charged. The transistor 78 remains in a nonconductive state, since a positive voltage is applied to the base thereof from the terminal 60 through the resistance 81. However, once any door of the vehicle is opened, a circuit is completed between the base of the transistor 78 and ground through the resistance 79 for overcoming the bias applied from the terminal 60 through the resistor 81 whereupon the PNP transistor is caused to conduct. Once the transistor 78 begins to conduct, the solenoid 82 is energized for closing the switch 86 for grounding the base of the transistor 80. Consequently, the transistor 80 thus is rendered conductive. A current flow also is established from the terminal 74 to the emitter of the transistor 80 and thence through the winding of the solenoid 92. As the current flows through the winding of the solenoid 92, the solenoid is actuated for closing the switch 96 and the contacts 142b, while opening the switch contacts 142a.

Once the solenoid 92 is actuated, a circuit is completed from the junction terminal 60 to the gate of the SCR 100 through the switch 96. As the circuit is completed to the gate of the SCR 100, the SCR becomes conductive and through the terminal 108 and switch 110 delivers a signal, at ground potential, to the input terminal 120 of the multivibrator circuit 18. As the circuit is completed through the SCR 100, a signal at ground potential also is applied from the terminal 108, to the solenoid 130 for closing switch 132 to the capacitor 138, but which cannot charge due to the grounding of the terminal 135 at switches 142b. Since a positive voltage is concurrently being applied from the terminal 60 to the multivibrator circuit 18 through the terminal 114, the transistors 116 and 118 alternately are caused to be fired, due to the alternating discharging of the capacitors 122 and 124 connected with the terminal 20 and the emitters of the transistors 116 and 118. As the transistor 118 is caused to conduct periodically or in a pulsing mode, the solenoid 128, connected in series therewith, is pulsed for causing the alarm relay to close the switch 20 in a pulsing mode. As the switch 20 is closed, an alarm mechanism 22, which may be the vehicle's horn, periodically is energized, or sounded.

Should an intruder, or the individual opening the door of the vehicle leave the vehicle and/or close the door, all switches between ground and the base of the transistor 78 will be open so that the transistor will cease to conduct. As the transistor 78 is rendered nonconductive, ground potential is removed from the base of the transistor 80 due to the opening of switch 86, subsequent to the discharge of the selected time delay imposed by the capacitor 94. The discharge, as presently provided for, will occur in 10 seconds after the signal is removed from the base of the transistor 78. Once the transistor 80 becomes nonconductive, the winding of the solenoid 92 is deenergized so that a circuit is completed through contact 142a, between ground and the SCR 140, and opened to ground at switch contact 142b, and closed at switch 96 between ground and the gate of the SCR 100. The SCR 140 now is ready to conduct through switch 142 and the winding of solenoid 144. However, the SCR 140 cannot be gated "on"

due to the charging of the capacitor 138 which, in practice, requires 60 seconds for imposing a delay in inactivating the multivibrator circuit 18. Once the capacitor 138 is charged, a gating signal is applied to the gate of the SCR 140 for thus causing it to conduct whereupon the winding of solenoid 144 is energized for causing the multivibrator circuit to be rendered inactive. Once the SCR 100 is rendered conductive, the solenoid 130 is energized to maintain the switch 132 closed so that a positive signal is applied to the terminal 135 and the switch 146 is maintained closed to ground for grounding the ignition circuit. However, the switch 132 can be opened by closing the ignition switch 30 for opening the circuit between battery 10 and the terminal 60.

It should be apparent that the circuit is "set" to be activated by an opening of a given door since such an opening will activate the solenoid 92 for breaking the circuit through SCR 140 so that the switch 110 can close. A subsequent closing of an open door, which serves to open the door switch which has been closed, causes contact 142a to close and contact 142b to open so that the switch 110, at the expiration of the 60 second period required for charging the capacitor 138, will open for deactivating the circuit 18. Should any of the door switches again be closed, the circuit is ready to conduct for again driving the multivibrator circuit 18 for energizing the warning circuit relay 20.

It is also to be noted that where the switch S is employed, an opening of the hood of the associated vehicle will complete a circuit at the switch S between the terminal 20 and ground so that a circuit is completed through the multivibrator circuit 18 for energizing the solenoid 128.

For purposes of illustration only, certain values for the circuit components, which have been successfully employed are provided, as follows:

| Components | Values |
|---|---|
| Resistor: | |
| 33 | 270 ohms. |
| 46 | 270 ohms. |
| 64 | 680 ohms. |
| Capacitor 66 | 500 micro-farads at 25 volts. |
| Resistor: | |
| 67 | 27 kilo ohms. |
| 71 | 68 kilo ohms. |
| 79 | 2.2 kilo ohms. |
| 81 | 500 ohms. |
| 84 | 270 ohms. |
| 88 | 100 ohms. |
| 90 | 270 ohms. |
| Capacitor 74 | 100 micro-farads at 25 volts. |
| Resistor: | |
| 98 | 39 kilo ohms. |
| 104 | 68 kilo ohms. |
| Capacitor: | |
| 106 | 100 micro-farads at 25 volts. |
| 122 | 25 micro-farads at 25 volts. |
| 124 | 100 micro-farads at 25 volts. |
| Resistor: | |
| 125 | 15 kilo ohms. |
| 126 | 47 kilo ohms. |
| 127 | 270 ohms. |
| 136 | 39 kilo ohms. |
| Capacitor 138 | 500 micro-farads at 25 volts. |
| Resistor 145 | 270 ohms. |

It is to be understood that the foregoing component values are intended as being representative and may be varied as the circuit parameters are varied.

Second Form

For production purposes, it has been found that the control circuit of FIG. 1 may be fabricated more economically where certain of the solenoids are eliminated or replaced by solid state switching devices or transistors. A circuit employing such devices is more clearly illustrated in FIG. 3.

Figure 3:
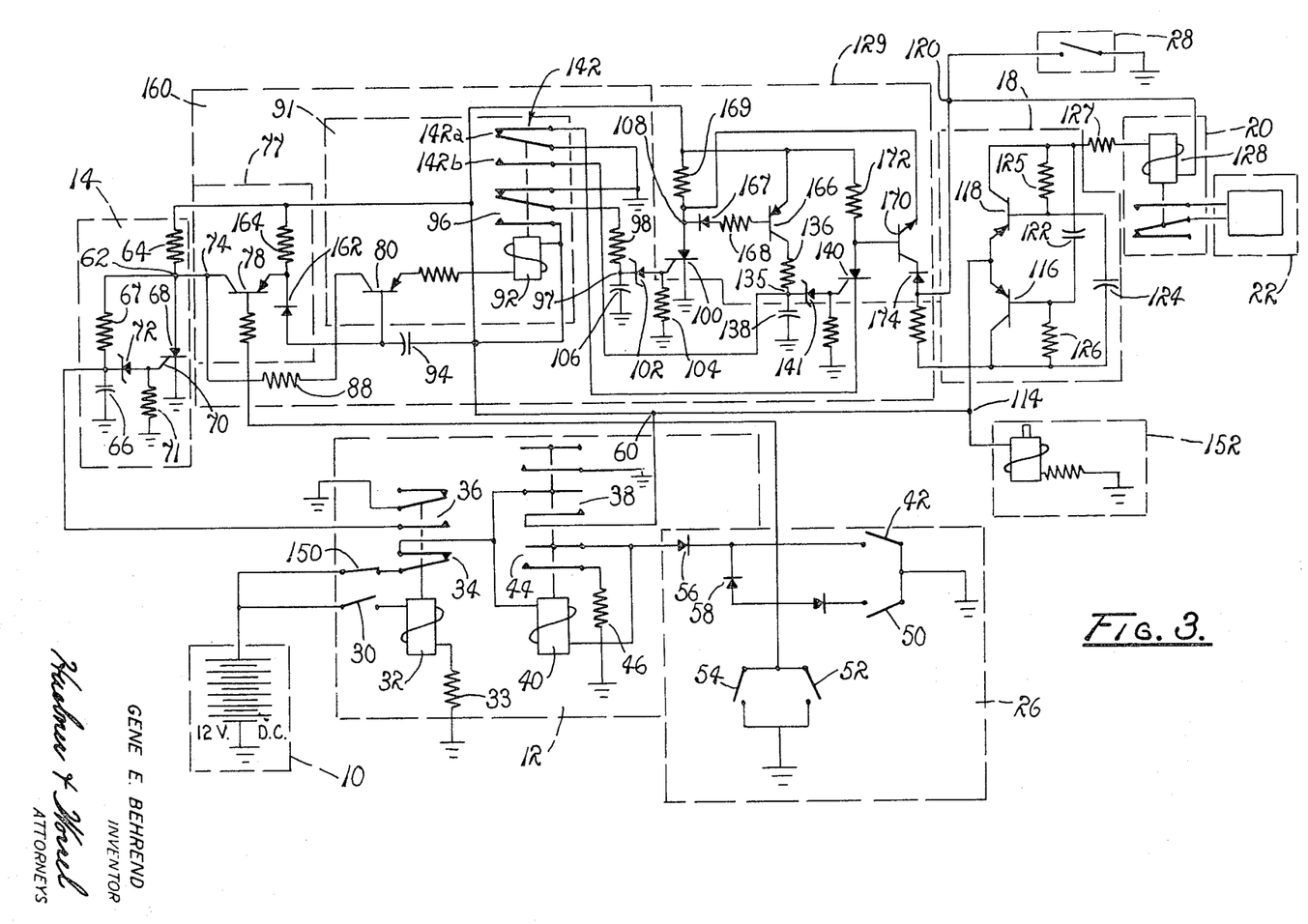
FIG. 3 is a functional diagram of the circuit shown in FIG. 1 illustrating the functional components of another modification of the circuit.

It is to be noted and understood that the circuits 10, 12 and 14 are of substantially the same design as those circuits depicted in FIG. 2. However, as illustrated in FIG. 3, there is provided a circuit 160 which serves as a control circuit for performing functions quite similar to that of the circuit 16.

It is to be noted that the control circuit 160 includes the PNP transistors 78 and 80. The base of the transistor 80 is electrically connected through a blocking diode 162 in series with the emitter of the PNP transistor 78. Therefore, a signal at ground potential can be applied to the base of 80 through the emitter of the transistor 78. Hence, as before, when the PNP transistor 78 is rendered conductive, the transistor 80 is switched to conduct in response to a forward biasing signal being applied to the base thereof as a consequence of the switching of the transistor 78. The emitter of the transistor 80 now provides an output from the transistor 80 to the winding of the solenoid 92 so that it is employed to drive the solenoid 92 in the manner and for the purposes heretofore described with respect to the circuit of FIG. 2. A load resistance 164 is included in the circuit between the emitter of the transistor 78 and the positive output terminal 60 for applying a bias thereto.

The output derived from the transistor 80 is employed to close the switches 96 and 142 in a manner similar heretofore described, with respect to FIG. 2. The signal directed from the switch 96, as it is closed by the solenoid 92, is employed at the gate of the SCR 100 for achieving a switching of the SCR. The output from the SCR is directed to the base of a PNP transistor 166, connected at its base to the terminal 108 through a suitable blocking diode 67 and a load resistance 168. The transistor 166 is so connected in the circuit to have its emitter electrically connected with the positive output terminal 60 while the collector thereof is connected to the terminal 135 through the resistance 136.

A suitable load resistance 169 is coupled between the base of the transistor 166 and the terminal 60 so that as a practical matter, the transistor 166 is biased "off" through a resistance 169 as a voltage is applied therethrough from the terminal 60 to the terminal 108. However, this bias is overcome as the SCR 100 is switched to a conductive mode.

It will be recalled that the terminal 135 is grounded at the switch 142 when the winding of the solenoid 92 has been energized. Therefore, the output of the PNP transistor 166 is delivered to ground so long as switch contacts 142b are closed.

In addition to the base of the transistor 166, the emitter of an NPN transistor 170 is connected at the output of the SCR 100 so that ground potential may be applied thereto through the SCR 100 when it is switched to a conducting mode. Of course, in order to switch the NPN transistor to a conducting mode a positive signal is obtained at the terminal 60 and applied thereto through a suitable load resistor 172.

Therefore, it should be apparent that once a signal is obtained and applied at the emitter of the NPN transistor 170 the forward biasing signal applied to the base thereof switches the transistor to a conducting mode. The output of the transistor 172 is then applied to the terminal 120 through a suitable blocking diode 174.

When an output signal is applied to the terminal 120 the multivibrator circuit becomes energized and serves to drive the alarm relay 20 in the manner aforedescribed.

It should be readily apparent that the circuit illustrated in FIG. 3 functions in a manner quite similar and for purposes similar to those of the circuit illustrated in FIG. 2. Further, the various time delay functions are achieved in both circuits in a similar fashion. Therefore, a second detailed description of the function of the capacitors employed in obtaining the desired delay is omitted in the interest of brevity.

Operation of the Second Form

Operation of the second form of the invention, as illustrated in FIG. 3, is quite similar to the operation aforediscussed with respect to the circuit of FIG. 2. Hence, it will be appreciated that when the modified circuit of FIG. 3 is employed, a positive voltage is delivered by the circuit of the "set" circuit 12 to the terminal 60 in response to the opening of a preselected door, and a closing of an associated switch 42 in the manner heretofore described.

A subsequent closing of any door associated switch 42, 50, 52 or 54 causes the PNP transistor 78 to be switched "on" or to a conductive mode, due to the application of a signal at ground to its base. A negative going signal is now applied to the base of the transistor 80 through the diode 162 causing this transistor to conduct so that the solenoid 92 is caused to energize and drive the contact 142a open and the contact 142b closed. The terminal 135 is now connected to ground through the switch 142b. However, the switch 96 now closes between the terminals 97 and 60 so that at the expiration of the charging period for the capacitor 106, the SCR 100 is caused to switch "on" or conduct. As this occurs, ground potential appears at the terminal 108 so that a forward biasing signal is applied to the PNP transistor 166. However, it is not caused to conduct, due to contact 142b. Even though the transistor 166 is not conducting, a negative going signal is applied to the emitter of the PNP transistor 170 for switching it to its conducting mode for providing an input or driving signal to the multivibrator circuit 18. Now the multivibrator is caused to function in the manner aforedescribed for driving the alarm relay 20 as the capacitors 122 and 124 alternately are fired.

When the solid state switches 78 and 80 cease to conduct, as a consequence of the closing of an open door, the winding of solenoid 92 is deenergized as the circuit through the transistors 78 and 80 is opened, subsequent to a delay imposed by the capacitor 94, whereupon contacts 142a close. A circuit through the SCR 140 to ground through the contacts 142b open for removing ground potential from the terminal 135. The SCR 100 remains in a conducting state so that as ground potential is removed from the terminal 135, the capacitor 138 is charged and SCR 140 is switched "on," after a predetermined delay imposed by the capacitor 138. The NPN transistor 170 is now reverse-biased by the application of a signal at ground potential to the base thereof so that the multivibrator circuit 18 now is inactivated, and the circuit is again set so that should be winding of the solenoid 92 again be energized, SCR 100 will cause transistor 170 to turn "on," for thereby causing the circuit 18 to again be activated for sounding the alarm operatively connected with the alarm relay.

In view of the foregoing, it is readily apparent that the circuitry herein described provides a simplified transistorized intruder detector and warning system which interconnects existing circuit components of motorized vehicles and provides for a delay in the "setting" thereof to accommodate driver exit and which responds to a subsequent opening of the hood or any door of the vehicle, in the presence of an open ignition circuit for establishing an alarm, and which will automatically reset after a predetermined delay when an open door is subsequently closed.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A transistorized intruder detection and warning system for vehicles of the type including an electrically energizable warning device, closable access doors and an electrical ignition circuit comprising:
   A. means mounting the system within a vehicle;
   B. a system energization circuit including,
      1. a source of electrical potential,
      2. an output circuit including a first normally open switch connected with said source of potential,
      3. a switching circuit including a first solenoid interconnected with the ignition circuit adapted to close the first normally open switch when the ignition circuit is opened;
   C. a driver circuit adapted to electrically drive the warning device including a solid state multivibrator circuit connected with the warning device of the vehicle and adapted to be energized selectively to drive the warning device;
   D. a solid state control circuit connected between the driver circuit and the energization circuit adapted to be activated to complete an electrical circuit between the energization circuit and the driver circuit;
   E. a plurality of normally open door switches, each of which is electrically connected with the control circuit and operatively coupled with a door of the vehicle adapted to close in response to an opening of the door for effecting an activation of the control circuit when a door of the vehicle is open;
   F. a timing circuit electrically connected with the control circuit adapted to impose a selected time delay between the opening of a preselected door and the activation of the driver circuit;
   G. means including circuit means connected with the driver circuit for interrupting the energization of the warning device in response to a closing of an open door; and
   H. means connected with the driver circuit for effecting a delay between the closing of an open door and the interruption of the energization of the warning device.

2. The system according to claim 1 further comprising:
   A. a disabling circuit including a toggle switch connected within the energization circuit between the source of electrical potential and the control circuit adapted to be manually opened for disabling the system energization circuit; and
   B. switch means connected with the ignition circuit adapted to positively inactivate the vehicle ignition circuit simultaneously with the activation of the control circuit.

3. The system according to claim 2 wherein the energization circuit further includes:
   A. a second normally open switch connected in series with the first normally open switch;
   B. a second solenoid adapted to be energized for closing said second normally open switch; and
   C. means connecting a preselected one of the normally open door switches of the set of normally open switches in series with said second solenoid adapted to complete a circuit from the first normally open switch through the second solenoid for energizing said second solenoid at the first opening of the preselected door subsequent to an opening of the ignition circuit.

4. The system according to claim 3 wherein the solid state control circuit includes:
   A. a pair of transistors including a first and a second operatively associated PNP transistor;
   B. means connecting the base of the first transistor of the pair with ground potential through at least one switch of said plurality of normally open door switches when a door of the vehicle is open, whereby the first transistor is caused to conduct an electrical current;
   C. transistor controlled switch means operatively coupled with the first transistor of said pair adapted to close in response to a current flow established through the first transistor;
   D. circuit means electrically connecting the emitter of the second transistor with the driver circuit and the base with ground potential through said transistor controlled switch means, whereby the second transistor is caused to conduct after the first transistor is caused to conduct; and
   E. a capacitor electrically connected with the base of the second transistor adapted to apply a forward biasing voltage to the base of the second transistor subsequent to the opening of the transistor controlled switch means, whereby the second transistor continues to conduct after the first transistor ceases to conduct, so that an electrical signal is applied for a determinable duration to the driver circuit after all doors are closed.

5. The system of claim 4 wherein said timing circuit includes:
   A. an SCR connected to ground;
   B. a capacitor of the preselected capacitance connected with the system energization circuit and the gate of the SCR, whereby the SCR is caused to be switched to a conductive state subsequent to the charging of the capacitor by the energization circuit, and C. means connecting the output of said SCR to the collector of the first transistor of the pair of PNP transistors, whereby a current flow may be established through the first transistors in the presence of a forward biasing signal applied to its base and in response to a pulse provided to the gate of said SCR by the system energization circuit.

6. An intruder detector and warning system for a vehicle having a multiplicity of doors comprising:
   A. a source of DC electrical energy;
   B. a vehicle ignition circuit connected with said source of energy;
   C. first switch means connected with the ignition circuit adapted to close in response to the opening of the ignition circuit;
   D. second switch means including a plurality of normally open switches coupled with the doors of the vehicle, each adapted to complete a circuit to ground in response to an opening of an associated door;
   E. third switch means comprising a circuit including an output terminal being operatively connected with the second switch means adapted to respond to a closing of the second switch means for completing an output circuit from the source of electrical energy to said output terminal;
   F. a time-delay circuit connected with the output circuit at said terminal adapted to be energized by an output signal directed from the source of energy through the output terminal;
   G. a detector including a circuit connected with the time-delay circuit adapted to be electrically energized in response to an output from the time-delay circuit;
   H. means connected with the detector circuit adapted to switch the detector circuit to an activated state in response to a closing of said second switch means, whereby said detector circuit is caused to provide a detector output signal;
   I. fourth switch means connected with the detector circuit adapted to provide an SCR gate signal in response to a detector output signal;
   J. means including an SCR connected with the fourth switch means adapted to respond to the SCR gate signal to switch the SCR to cause the SCR to provide an output signal;
   K. a solid state multivibrator circuit connected with the SCR adapted to be driven by the output signal provided thereby to establish a pulsating relay activating signal;
   L. a warning device relay circuit electrically connected with the multivibrator adapted to respond to the activating output signal;
   M. fifth switch means connected between the SCR and the multivibrator circuit adapted to respond to an absence of a detector output signal for thus opening the circuit between the SCR and the multivibrator in the absence of a detector output signal;
   N. delay means including a circuit having connected therein a capacitor adapted to delay the opening of the fifth switch means, whereby the multivibrator drives the relay circuit in the absence of a detector output signal for a determinable period of time; and
   O. means connected between the fourth and the fifth switch means adapted to prepare the fifth switch for closing when a detector output signal is provided by the detector circuit subsequent to an opening thereof.

7. The system of claim 6 wherein the detector includes a pair of interconnected solid state switches connected in a manner such that the first switch must be rendered conductive before the second switch can be rendered conductive.

8. They system of claim 7 further including an electrically driven solenoid and a normally open switch operatively coupled thereto and connected between a source of forward biasing potential and the base of the second solid state switch adapted to close when the first solid state switch is rendered conductive so that the second solid state switch is caused to conduct as it is forward biased.

9. The system of claim 6 wherein the fifth switch means includes an electrically energizable solenoid and a mechanically actuated switch coupled with the solenoid and adapted to be actuated thereby.

10. The system according to claim 6 wherein the fifth switch means comprises a solid state switching circuit including a plurality of interconnected solid state switching devices.

11. An intruder detection and warning system for use in a vehicle having a plurality of doors and a source of electrical energy comprising:
   A. an electrically activatable alarm;
   B. means including a control circuit coupled with the alarm adapted to be switched to an energized state for activating the alarm and to a set state preparatory to being switched to the energized state;
   C. means for switching said control circuit to the said set state in response to a first opening of a selected one of said doors; and
   D. means for switching said control circuit to said energized state in response to a opening of one of said doors, subsequent to said first opening, whereby said control circuit is switched to a set state in response to a first opening of one of said doors and to an energized state in response to a subsequent opening of one of said doors for thereby activating said alarm.

12. An intruder detection and warning system for use in a vehicle having a door, an ignition system, and a source of electrical energy comprising:
   A. an electrically activatable alarm;
   B. means including a control circuit adapted to be switched to an energized state for activating the alarm, and to a "set" state preparatory to being switched to the energized state;
   C. means for switching said control circuit to the set state, including,
      i. a door switch operatively associated with said door adapted to open when said door is closed and to close when said door is opened,
      ii. a switching circuit including an output terminal operatively associated with said source of electrical energy and said door switch adapted to respond to a first closing of the door switch to provide an output voltage at said output terminal,
      iii. means for applying said output voltage to said control circuit for switching the control circuit to said set state, and
      iv. a time-delay circuit coupled with said output terminal and said control circuit adapted to respond to said output voltage to initiate a predetermined delay between the opening of said door and the switching of said control circuit to said set state, whereby said control circuit is switched to said set state subsequent to a predetermined delay after the door switch is first closed; and
   D. a trigger means coupled with said door switch and said control circuit energizable in response to a second closing of said door switch for switching the control circuit from the set state to the energized state for activating the alarm in response to a second closing of said door switch.

13. The system of claim 12 wherein said vehicle includes an additional door and an associated door switch operatively coupled with said trigger means adapted to close in response to an opening of the additional door for energizing said trigger circuit.

14. The system of claim 13 wherein said ignition system includes a bistable ignition circuit adapted to be switched between opened and closed conditions, and said switching circuit comprises a normally open circuit coupled with said ignition circuit and adapted to close as said ignition circuit is switched to an open condition.

15. The system of claim 14 further comprising means including an additional time-delay circuit coupled with said alarm and with the door switch for deactivating said alarm subsequent to an opening of said door switch.

16. The system of claim 13 wherein the vehicle is provided with a hood and an associated switch operatively coupled with said trigger means adapted to close in response to an opening of the hood for energizing said trigger means to achieve an activation of said alarm.

17. A transistorized intruder detection and warning system for a vehicle of the type including an electrically energizable warning device, closable access doors, a warning device and an electrical ignition circuit comprising:
A. a system energization circuit including,
   i. a source of electrical potential,
   ii. an output circuit including a first normally open switch connected with said source of potential, and
   iii. a switching circuit including means interconnected with the ignition circuit adapted to close the first normally open switch when the ignition circuit is opened;
B. an electrically energizable driver circuit connected with the warning device of the vehicle;
C. a control circuit connected between the driver circuit and the energization circuit for completing an electrical circuit between the energization circuit and the driver circuit;
D. a plurality of normally open door switches connected with the control circuit and operatively associated with the access doors of the vehicle adapted to be closed in response to an opening of the associated doors for effecting an activation of the control circuit;
E. a timing circuit electrically connected with the control circuit adapted to impose a selected time-delay between the opening of a preselected door and the activation of the driver circuit;
F. means connected with the driver circuit for interrupting the energization of the warning device in response to a closing of an open door; and
G. means connected with the driver circuit for effecting a delay between the closing of an open door and the interruption of the energization of the warning device.